United States Patent
Xu et al.

(10) Patent No.: US 9,711,975 B2
(45) Date of Patent: Jul. 18, 2017

(54) POWER BANK CIRCUIT AND THE METHOD THEREOF

(71) Applicant: Chengdu Monolithic Power Systems Co., Ltd., Chengdu (CN)

(72) Inventors: Min Xu, Hangzhou (CN); Qiming Zhao, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 198 days.

(21) Appl. No.: 14/593,970

(22) Filed: Jan. 9, 2015

(65) Prior Publication Data

US 2015/0194826 A1    Jul. 9, 2015

(30) Foreign Application Priority Data

Jan. 9, 2014 (CN) .......................... 2014 1 0009655

(51) Int. Cl.
*H02J 7/00* (2006.01)

(52) U.S. Cl.
CPC ............ *H02J 7/0009* (2013.01); *H02J 7/007* (2013.01); *H02J 7/0021* (2013.01)

(58) Field of Classification Search
CPC ........................................................ H02J 7/007
USPC ................................................................ 320/136
See application file for complete search history.

(56) References Cited

U.S. PATENT DOCUMENTS

| | | | |
|---|---|---|---|
| 6,314,007 B2* | 11/2001 | Johnson, Jr. | 307/66 |
| 6,437,549 B1 | 8/2002 | Takagishi | |
| 6,873,134 B2* | 3/2005 | Canter | H02J 7/0021 320/118 |
| 7,372,709 B2* | 5/2008 | Mazumder | H02J 3/387 363/132 |
| 7,420,792 B2 | 9/2008 | Zhang | |
| 7,598,710 B2 | 10/2009 | Zhang | |
| 2006/0071639 A1* | 4/2006 | Ross | H02J 7/0063 320/116 |
| 2009/0296442 A1* | 12/2009 | Chang | H02J 7/0054 363/142 |
| 2012/0176088 A1* | 7/2012 | Lee | H02J 3/383 320/128 |
| 2013/0214733 A1* | 8/2013 | Liang | H02J 7/0014 320/108 |
| 2014/0117924 A1 | 5/2014 | Chen et al. | |
| 2014/0152242 A1 | 6/2014 | Bai et al. | |
| 2014/0152243 A1 | 6/2014 | Xu et al. | |
| 2015/0102787 A1 | 4/2015 | Xu et al. | |
| 2015/0123480 A1 | 5/2015 | Xu et al. | |

* cited by examiner

*Primary Examiner* — Yalkew Fantu
(74) *Attorney, Agent, or Firm* — Perkins Coie LLP

(57) ABSTRACT

A power bank circuit controlling power switches to operate at different modes in accordance with different external coupling situations is discussed. The power bank circuit may be coupled to either a power source, a digital device, or a plurality of series coupled batteries at a high voltage port; and may be coupled to either a power source, a digital device, or a single battery at a low voltage port.

16 Claims, 8 Drawing Sheets

POWER BANK CIRCUIT AND THE METHOD THEREOF

CROSS-REFERENCE TO RELATED APPLICATION(S)

This application claims priority to and the benefit of Chinese Patent Application No. 201410009655.5, filed Jan. 9, 2014, which is incorporated herein by reference in its entirety.

TECHNICAL FIELD

The present invention relates generally to electrical circuits, and more particularly but not exclusively to power bank circuit and the method thereof.

BACKGROUND

Power bank is a portable device that can be both charged and discharged, which charges digital devices such as cell phones when needed. A power bank normally comprises a battery and a control circuit thereof. FIG. 1 schematically shows a block diagram of a prior art power bank 10. As shown in FIG. 1, the power bank 10 comprises: an input-output port 11, a battery port 12 and a charge-discharge circuit 13, wherein the input-output port 11 is coupled to a power source or a digital device, the battery port 12 is coupled to a battery 14. Typically, the battery 14 is a single battery (1-cell), which has a 3.7~4.2V voltage level when fully charged; the power source (e.g., an adapter) provides an input voltage which has a 5V voltage level; and the digital device has a 5V voltage level supply requirement. So when the input-output port 11 is coupled to the power source, the charge-discharge circuit 13 operates at step-down (e.g., buck) mode, so that the battery 14 is charged by the power source; and when the input-output port 11 is coupled to the digital device, the charge-discharge circuit 13 operates at step-up (e.g., boost) mode, so that the battery 14 is discharged, to supply the digital device.

With the increase of the consumer's requirement, more power provided by the power bank is desired. One example is to replace the single battery 14 with two series coupled batteries (i.e., to replace 1-cell with 2-cell). However, when the input-output port 11 is coupled to the power source with 5V voltage level, if the charge-discharge circuit 13 still works at step-down mode, the two series coupled batteries can not be fully charged; and when the input-output port 11 is coupled to the digital device, if the charge-discharge circuit 13 still works at step-up mode, due to the voltage across the two series coupled batteries is higher than the voltage requirement of the digital device (i.e., the input voltage is higher than the output voltage), the step-up mode could not be started up, so the digital device could not get power supplied.

SUMMARY

A power bank circuit controlling power switches to operate at different modes in accordance with different external coupling situations is provided. The power bank circuit has a high voltage port; a low voltage port, two power switches and a controller. The power switches are controlled to operate at step-down charge mode when the high voltage port is coupled to a power source, and the low voltage port is coupled to a single battery; to operate at step-up discharge mode when the high voltage port is coupled to a digital device, and the low voltage port is coupled to the single battery; to operate at step-up charge mode when the high voltage port is coupled to two series coupled batteries, and the low voltage port is coupled to the power source; and to operate at step-down discharge mode when the high voltage port is coupled to the two series coupled batteries, and the low voltage port is coupled to the digital device.

The use of the same reference label in different drawings indicates the same or like components.

DETAILED DESCRIPTION

In the present invention, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
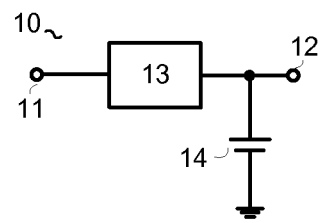
FIG. 1 schematically shows a block diagram of a prior art power bank 10.
Figure 2:
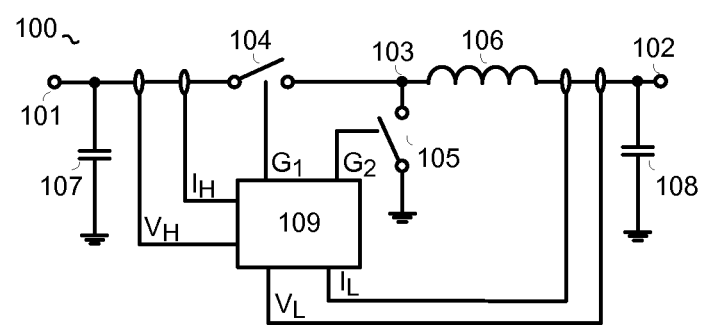
FIG. 2 schematically shows a block diagram of a power bank circuit 100 in accordance with an embodiment of the present invention.

FIG. 2 schematically shows a block diagram of a power bank circuit 100 in accordance with an embodiment of the present invention. In the example of FIG. 1, the power bank circuit 100 comprises: a high voltage port 101; a low voltage port 102; an intermediate port 103; a first power switch 104, coupled between the high voltage port 101 and the intermediate port 103; a second power switch 105, coupled between the intermediate port 103 and a reference ground; an inductor 106, coupled between the low voltage port 102 and the intermediate port 103; a first capacitor 107, coupled between the high voltage port 101 and the reference ground; a second capacitor 108, coupled between the low voltage port 102 and the reference ground; and a controller 109, configured to receive: a high voltage sense signal $V_H$ indicative of a voltage at the high voltage port 101, a high port current sense signal $I_H$ indicative of a current flowing through the high voltage port 101, a low voltage sense signal $V_L$ indicative of a voltage at the low voltage port 102, a low port current sense signal $I_L$ indicative of a current flowing through the low voltage port 102, to generate a first switch control signal $G_1$ and a second switch control signal $G_2$ to control the operations of the first power switch 104 and the second power switch 105, respectively.

In one embodiment, the high voltage port 101 may be coupled to either a power source (e.g., an adapter), a digital device or a plurality of series coupled batteries (e.g., two series coupled batteries); and the low voltage port 102 may be coupled to either a power source, a digital device or a single battery.

Figure 3:
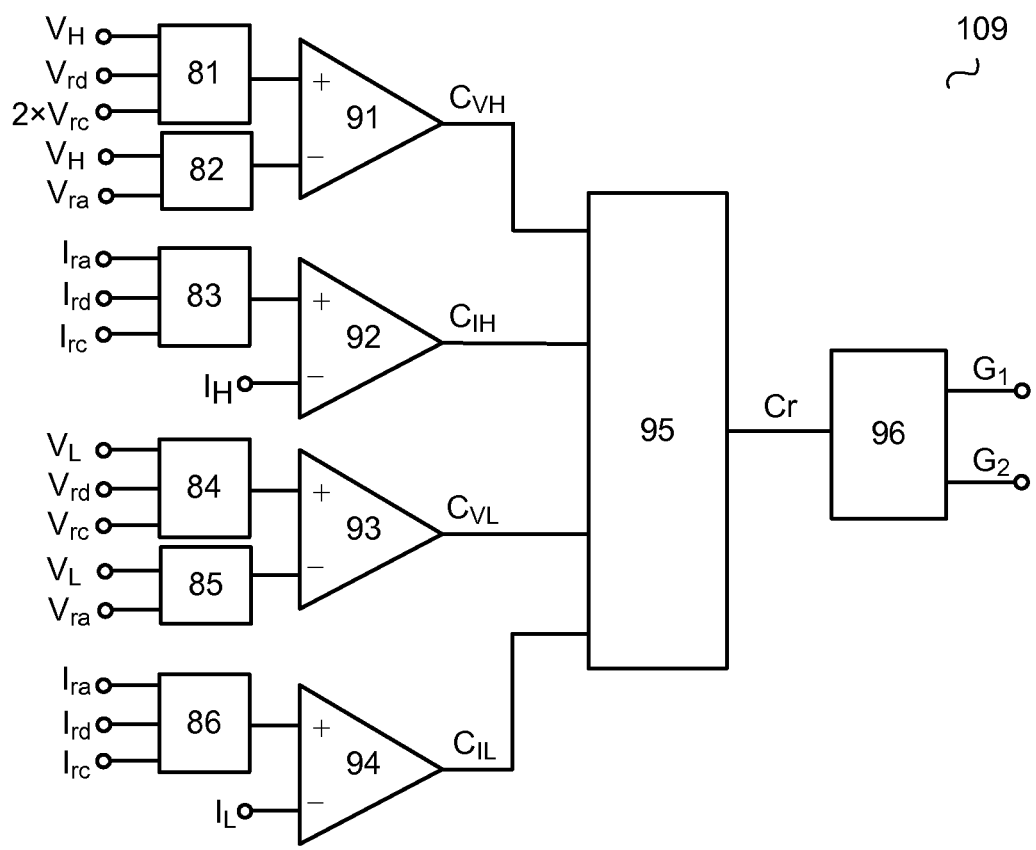
FIG. 3 schematically shows a circuit configuration of the controller 109 in accordance with an embodiment of the present invention.

FIG. 3 schematically shows a circuit configuration of the controller 109 in accordance with an embodiment of the present invention. In the example of FIG. 3, the controller 109 comprises: a first selective module 81, configured to receive the high voltage sense signal $V_H$, a digital device voltage reference $V_{rd}$, and a reference voltage ($2 \times V_{rc}$) having a voltage level twice than that of a battery voltage reference $V_{rc}$, and to select either the high voltage sense signal $V_H$, the digital device voltage reference $V_{rd}$, or the reference voltage $2 \times V_{rc}$ as its output signal; a second selective module 82, configured to receive a power source voltage reference $V_{ra}$ and the high voltage sense signal $V_H$, and to select the power source voltage reference $V_{ra}$ or the high voltage sense signal $V_H$ as its output signal; a high port voltage operational amplifier 91, having a first input terminal, a second input terminal and an output terminal, wherein the first input terminal is configured to receive either the high voltage sense signal $V_H$, the digital device voltage reference $V_{rd}$, or the reference voltage $2 \times V_{rc}$ via the first selective module 81, the second input terminal is configured to receive the power source voltage reference $V_{ra}$ or the high voltage sense signal $V_H$ via the second selective module 82, and the output terminal is configured to generate a high port voltage compensation signal $C_{VH}$; a third selective module 83, configured to receive a power source current reference $I_{ra}$, a digital device current reference $I_{rd}$, and a battery current reference $I_{rc}$, and to select either the power source current reference $I_{ra}$, the digital device current reference $I_{rd}$, or the battery current reference $I_{rc}$ as its output signal; a high port current operational amplifier 92, having a first input terminal, a second input terminal and an output terminal, wherein the first input terminal is configured to receive either the power source current reference $I_{ra}$, the digital device current reference $I_{rd}$, or the battery current reference $I_{rc}$ via the third selective module 83, the second input terminal is configured to receive the high port current sense signal $I_H$, and the output terminal is configured to generate a high port current compensation signal $C_{IH}$; a fourth selective module 84, configured to receive the low voltage sense signal $V_L$, the digital device voltage reference $V_{rd}$ and the battery voltage reference $V_{rc}$, and to select either the low voltage sense signal $V_L$, the digital device voltage reference $V_{rd}$, or the battery voltage reference $V_{rc}$ as its output signal; a fifth selective module 85, configured to receive the low voltage sense signal $V_L$ and the power source voltage reference $V_{ra}$, and to select the low voltage sense signal $V_L$ or the power source voltage reference $V_{ra}$ as its output signal; a low port voltage operational amplifier 93, having a first input terminal, a second input terminal and an output terminal, wherein the first input terminal is configured to receive either the low voltage sense signal $V_L$, the digital device voltage reference $V_{rd}$, or the battery voltage reference $V_{rc}$ via the fourth selective module 84, the second input terminal is configured to receive the low voltage sense signal $V_L$ or the power source voltage reference $V_{ra}$ via the fifth selective module 85, and the output terminal is configured to generate a low port voltage compensation signal $C_{VL}$; a sixth selective module 86, configured to receive the power source current reference $I_{ra}$, the digital device current reference $I_{rd}$ and the battery current reference $I_{rc}$, and to select either the power source current reference $I_{ra}$, the digital device current reference $I_{rd}$, or the battery current reference $I_{rc}$ as its output signal; a low port current operational amplifier 94, having a first input terminal, a second input terminal and an output terminal, wherein the first input terminal is configured to receive either the power source current reference $I_{ra}$, the digital device current reference $I_{rd}$, or the battery current reference I, via the sixth selective module 86, the second input terminal is configured to receive the low port current sense signal $I_L$, and the output terminal is configured to generate a low port current compensation signal $C_{IL}$; a selective unit 95, coupled to the high port voltage operational amplifier 91, the high port current operational amplifier 92, the low port voltage operational amplifier 93 and the low port current operational amplifier 94 to receive the high port voltage compensation signal $C_{VH}$, the high port current compensation signal $C_{IH}$, the low port voltage compensation signal $C_{VL}$ and the low port current compensation signal $C_{IL}$, respectively, to generate a reference signal Cr, wherein the reference signal Cr is either the high port voltage compensation signal $C_{VH}$, the high port current compensation signal $C_{IH}$, the low port voltage compensation signal $C_{VL}$ or the low port current compensation signal $C_{IL}$; and a logic and control unit 96, coupled to the selective unit 95 to receive the reference signal Cr, to generate the first switch control signal $G_1$ and the second switch control signal $G_2$ based on the reference signal Cr. The first power switch 104 and the second power switch 105 are controlled by the first switch control signal $G_1$ and the second switch control signal $G_2$, respectively.

In one embodiment, the selective unit 95 selects either the high port voltage compensation signal $C_{VH}$, the high port current compensation signal $C_{IH}$, the low port voltage compensation signal $C_{VL}$ or the low port current compensation signal $C_{IL}$ with the minimum value as the reference signal Cr. That is, in one embodiment, the selective unit 95 may comprise a minimum value selector. In other embodiments, the selective unit 95 may comprise a maximum value selector; it selects either the high port voltage compensation signal $C_{VH}$, the high port current compensation signal $C_{IH}$, the low port voltage compensation signal $C_{VL}$, or the low port current compensation signal $C_{IL}$ with the maximum value as the reference signal Cr. If the selective unit 95 comprises the maximum value selector, the high port voltage operational amplifier 91, the high port current operational amplifier 92, the low port voltage operational amplifier 93 and the low port current operational amplifier 94 would switch their inverting input terminal and non-inverting input terminal, respectively.

Figure 4:
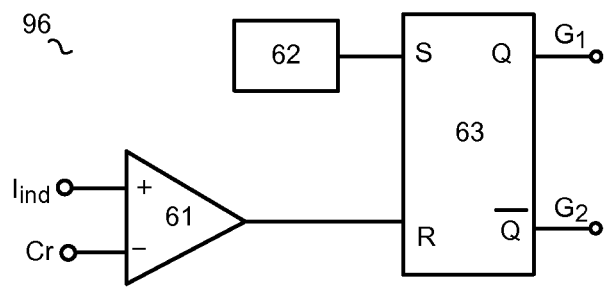
FIG. 4 schematically shows a circuit configuration of the logic and control unit 96 in accordance with an embodiment of the present invention.
Figure 5A:
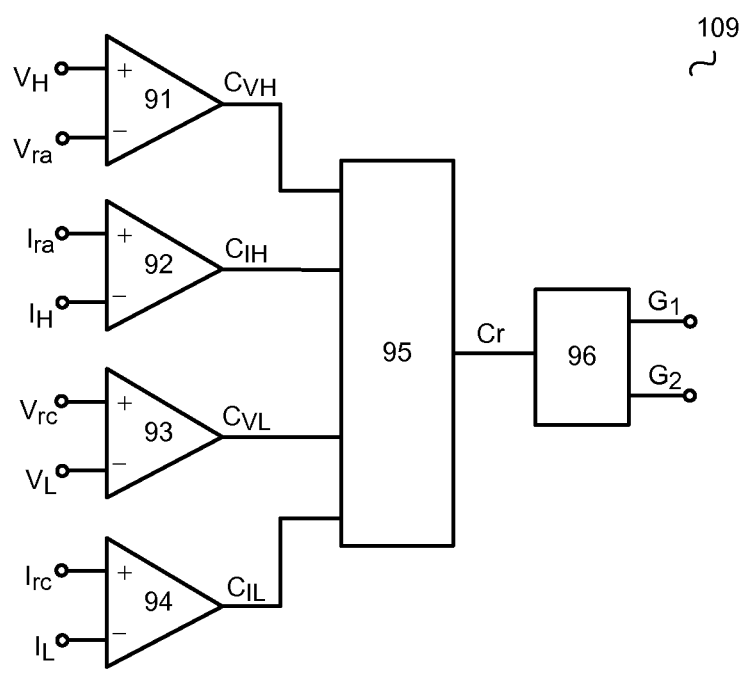
FIGS. 5a-5d schematically shows equivalent circuits of the controller 109 when the high voltage port and the low voltage port are with different coupling situations in accordance with an embodiment the present invention.
Figure 5B:
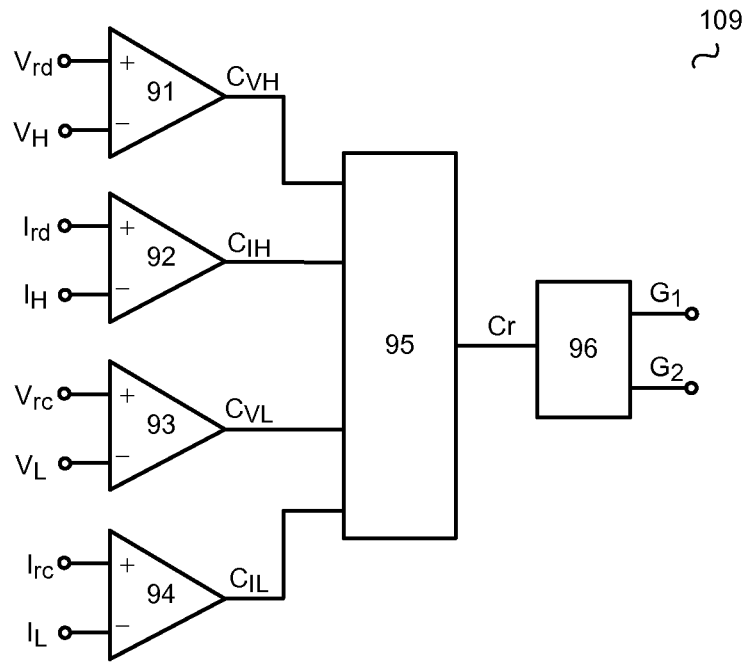
Figure 5C:
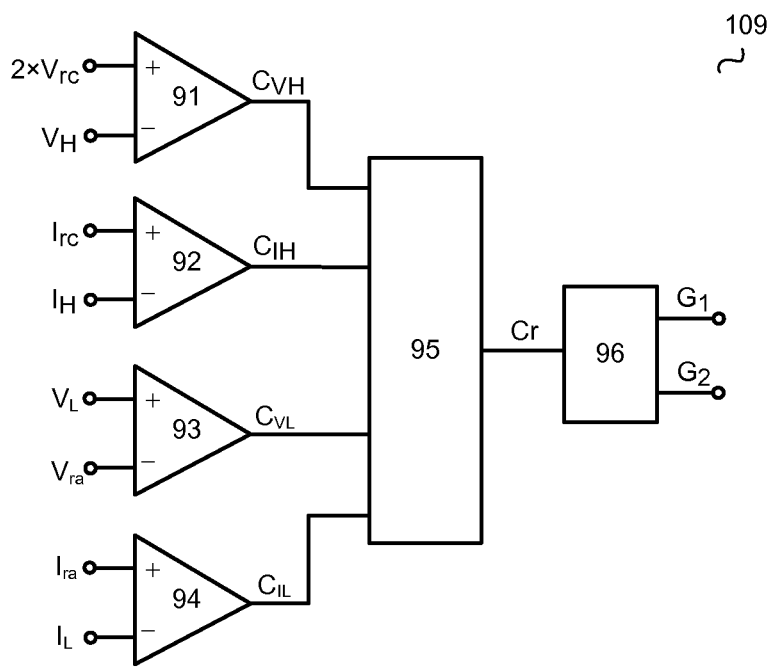
Figure 5D:
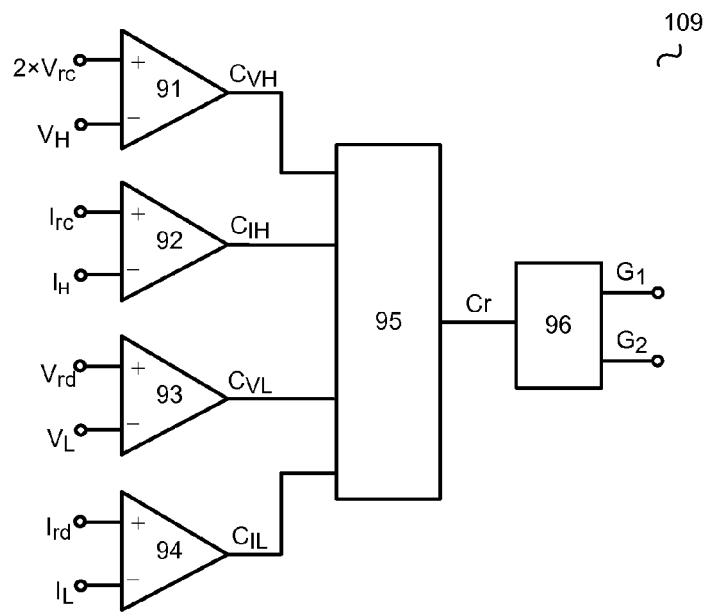

In one embodiment, the power bank circuit 100 may adopt peak current mode control. FIG. 4 schematically shows a circuit configuration of the logic and control unit 96 in accordance with an embodiment of the present invention. In the example of FIG. 4, the logic and control unit 96 comprises: a comparator 61, having a first input terminal, a second input terminal and an output terminal, wherein the first input terminal is configured to receive an inductor current sense signal $I_{ind}$ indicative of a current flowing through the inductor 106, the second input terminal is configured to receive the reference signal Cr, and the output terminal is configured to generate a comparison signal based on the inductor current sense signal $I_{ind}$ and the reference signal Cr; a clock signal generator 62, configured to generate a clock signal; and a RS flip-flop 63, having a set input terminal S, a reset input terminal R, a first output terminal Q and a second output terminal $\overline{Q}$, wherein the set input terminal S is coupled to the clock signal generator 62 to receive the clock signal, the reset input terminal R is coupled to the output terminal of the comparator 61 to receive the comparison signal, based on the clock signal and the comparison signal, the RS flip-flop 63 generates the first switch control signal $G_1$ at the first output terminal Q and generates the second switch control signal $G_2$ at the second output terminal $\overline{Q}$, to control the operations of the first power switch 104 and the second power switch 105.

In one embodiment, the logic and control unit 96 further comprises a slope compensation signal generator (not shown), configured to generate a slope compensation signal. The slope compensation signal is added with the inductor current sense signal, and the sum is compared to the reference signal to generate the comparison signal.

The operation of the power bank circuit 100 with different coupling situations at the high voltage port 101 and the low voltage port 102 will be discussed with reference to FIGS. 5a-5d as the following text.

When the high voltage port 101 is coupled to a power source, and the low voltage port 102 is coupled to a single battery (1-cell), the controller 109 controls the first power switch 104 and the second power switch 105 to operate at step-down mode based on the high voltage sense signal $V_H$, the high port current sense signal $I_H$, the low voltage sense signal $V_L$ and the low port current sense signal $I_L$, so that the single battery is charged by the power source. Under this condition, the first selective module 81 selects the high voltage sense signal $V_H$, the second selective module 82 selects the power source voltage reference $V_{ra}$, the third selective module 83 selects the power source current reference $I_{ra}$, the fourth selective module 84 selects the battery voltage reference $V_{rc}$, the fifth selective module 85 selects the low voltage sense signal $V_L$, and the sixth selective module 86 selects the battery current reference $I_{rc}$. That is, under this condition, the first input terminal of the high port voltage operational amplifier 91 is configured to receive the high voltage sense signal $V_H$ indicative of the voltage level of the power source, the second input terminal of the high port voltage operational amplifier 91 is configured to receive the power source voltage reference $V_{ra}$, and the high port voltage operational amplifier 91 generates the high port voltage compensation signal $C_{VH}$ based on the high voltage sense signal $V_H$ and the power source voltage reference $V_{ra}$; the first input terminal of the high port current operational amplifier 92 is configured to receive the power source current reference $I_{ra}$, the second input terminal of the high port current operational amplifier 92 is configured to receive the high port current sense signal $I_H$, and the high port current operational amplifier 92 generates the high port current compensation signal $C_{IH}$ based on the power source current reference $I_{ra}$ and the high port current sense signal $I_H$; the first input terminal of the low port voltage operational amplifier 93 is configured to receive the battery voltage reference $V_{rc}$, the second input terminal of the low port voltage operational amplifier 93 is configured to receive the low voltage sense signal $V_L$ indicative of the voltage across the single battery, and the low port voltage operational amplifier 93 generates the low port voltage compensation signal $C_{VL}$ based on the battery voltage reference $V_{rc}$ and the low voltage sense signal $V_L$; the first input terminal of the low port current operational amplifier 94 is configured to receive the battery current reference the second input terminal of the low port current operational amplifier 94 is configured to receive the low port current sense signal $I_L$, and the low port current operational amplifier 94 generates the low port current compensation signal $C_{IL}$ based on the battery current reference $I_{rc}$ and the low port current sense signal $I_L$. The equivalent circuit of the controller is shown as FIG. 5a. The selective unit 95 generates the reference signal Cr based on the above high port voltage compensation signal $C_{VH}$, high port current compensation signal $C_{IH}$, low port voltage compensation signal $C_{VL}$ and low port current compensation signal $C_{IL}$. Then the reference signal Cr is delivered to the logic and control unit 96, so that the logic and control unit 96 generates the first switch control signal $G_1$ and the second switch control signal $G_2$ to control the first power switch 104 and the second power switch 105 to operate at step-down mode. The first power switch 104 is the active switch, and the second power switch 105 is the passive switch.

When the high voltage port 101 is coupled to a digital device, and the low voltage port 102 is coupled to a single battery, the controller 109 controls the first power switch 104 and the second power switch 105 to operate at step-up mode based on the high voltage sense signal $V_H$, the high port current sense signal $I_H$, the low voltage sense signal $V_L$ and the low port current sense signal $I_L$, so that the digital device is powered by the single battery. Under this condition, the first selective module 81 selects the digital device voltage reference $V_{rd}$, the second selective module 82 selects the high voltage sense signal $V_H$, the third selective module 83 selects the digital device current reference $I_{rd}$, the fourth selective module 84 selects the battery voltage reference $V_{rc}$, the fifth selective module 85 selects the low voltage sense signal $V_L$, and the sixth selective module 86 selects the battery current reference $I_{rc}$. That is, under this condition, the first input terminal of the high port voltage operational amplifier 91 is configured to receive the digital device voltage reference $V_{rd}$, the second input terminal of the high port voltage operational amplifier 91 is configured to receive the high voltage sense signal $V_H$ indicative of the voltage across the digital device, and the high port voltage operational amplifier 91 generates the high port voltage compensation signal $C_{VH}$ based on the digital device voltage reference $V_{rd}$ and the high voltage sense signal $V_H$; the first input terminal of the high port current operational amplifier 92 is configured to receive the digital device current reference $I_{rd}$, the second input terminal of the high port current operational amplifier 92 is configured to receive the high port current sense signal $I_H$, and the high port current operational amplifier 92 generates the high port current compensation signal $C_{IH}$ based on the digital device current reference $I_{rd}$ and the high port current sense signal $I_H$; the first input terminal of the low port voltage operational amplifier 93 is configured to receive the battery voltage reference $V_{rc}$, the second input terminal of the low port voltage operational amplifier 93 is configured to receive the low voltage sense signal $V_L$ indicative of the voltage across the single battery, and the low port voltage operational amplifier 93 generates the low port voltage compensation signal $C_{VL}$ based on the battery voltage reference $V_{rc}$ and the low voltage sense signal $V_L$; the first input terminal of the low port current operational amplifier 94 is configured to receive the battery current reference $I_{rc}$, the second input terminal of the low port current operational amplifier 94 is configured to receive the low port current sense signal $I_L$, and the low port current operational amplifier 94 generates the low port current compensation signal $C_{IL}$ based on the battery current reference $I_{rc}$ and the low port current sense signal $I_L$. The equivalent circuit of the controller is shown as FIG. 5b. The selective unit 95 generates the reference signal Cr based on the above high port voltage compensation signal $C_{VH}$, high port current compensation signal $C_{IH}$, low port voltage compensation signal $C_{VL}$ and low port current compensation signal $C_{IL}$. Then the reference signal Cr is delivered to the logic and control unit 96, so that the logic and control unit 96 generates the first switch control signal $G_1$ and the second switch control signal $G_2$ to control the first power switch 104 and the second power switch 105 to operate at step-up mode. The first power switch 104 is the passive switch, and the second power switch 105 is the active switch.

When the high voltage port 101 is coupled to two series coupled batteries, and the low voltage port 102 is coupled to a power source, the controller 109 controls the first power switch 104 and the second power switch 105 to operate at step-up mode based on the high voltage sense signal $V_H$, the high port current sense signal $I_H$, the low voltage sense signal $V_L$ and the low port current sense signal $I_L$, so that the two series coupled batteries are charged by the power source. Under this condition, the first selective module 81 selects the reference voltage $2\times V_{rc}$, the second selective module 82 selects the high voltage sense signal $V_H$ indicative of the voltage across the two series coupled batteries, the third selective module 83 selects the battery current reference $I_{rc}$, the fourth selective module 84 selects the low voltage sense signal $V_L$, the fifth selective module 85 selects the power source voltage reference $V_{ra}$, and the sixth selective module 86 selects the power source current reference $I_{ra}$. That is, under this condition, the first input terminal of the high port voltage operational amplifier 91 is configured to receive the reference voltage $2\times V_{rc}$, the second input terminal of the high port voltage operational amplifier 91 is configured to receive the high voltage sense signal $V_H$; and the high port voltage operational amplifier 91 generates the high port voltage compensation signal $C_{VH}$ based on the high voltage sense signal $V_H$ and the reference voltage $2\times V_{rc}$; the first input terminal of the high port current operational amplifier 92 is configured to receive the battery current reference $I_{rc}$, the second input terminal of the high port current operational amplifier 92 is configured to receive the high port current sense signal $I_H$, and the high port current operational amplifier 92 generates the high port current compensation signal $C_{IH}$ based on the battery current reference $I_{rc}$ and the high port current sense signal $I_H$; the first input terminal of the low port voltage operational amplifier 93 is configured to receive the low voltage sense signal $V_L$ indicative of the voltage level of the power source, the second input terminal of the low port voltage operational amplifier 93 is configured to receive the power source voltage reference $V_{ra}$, and the low port voltage operational amplifier 93 generates the low port voltage compensation signal $C_{VL}$ based on the power source voltage reference $V_{ra}$ and the low voltage sense signal $V_L$; the first input terminal of the low port current operational amplifier 94 is configured to receive the power source current reference $I_{ra}$, the second input terminal of the low port current operational amplifier 94 is configured to receive the low port current sense signal $I_L$, and the low port current operational amplifier 94 generates the low port current compensation signal $C_{IL}$ based on power source current reference I, and the low port current sense signal $I_L$. The equivalent circuit of the controller is shown as FIG. 5c. The selective unit 95 generates the reference signal Cr based on the above high port voltage compensation signal $C_{VH}$, high port current compensation signal $C_{IH}$, low port voltage compensation signal $C_{VL}$ and low port current compensation signal $C_{IL}$. Then the reference signal Cr is delivered to the logic and control unit 96, so that the logic and control unit 96 generates the first switch control signal $G_1$ and the second switch control signal $G_2$ to control the first power switch 104 and the second power switch 105 to operate at step-up mode. The first power switch 104 is the passive switch, and the second power switch 105 is the active switch.

When the high voltage port 101 is coupled to two series coupled batteries, and the low voltage port 102 is coupled to a digital device, the controller 109 controls the first power switch 104 and the second power switch 105 to operate at step-down mode based on the high voltage sense signal $V_H$, the high port current sense signal $I_H$, the low voltage sense signal $V_L$ and the low port current sense signal $I_L$, so that the digital device is powered by the two series coupled batteries. Under this condition, the first selective module 81 selects the reference voltage $2\times V_{rc}$, the second selective module 82 selects the high voltage sense signal $V_H$ indicative of the voltage across the two series coupled batteries, the third selective module 83 selects the battery current reference $I_{rc}$, the fourth selective module 84 selects the digital device voltage reference $V_{rd}$, the fifth selective module 85 selects the low voltage sense signal $V_L$ indicative of the voltage across the digital device, and the sixth selective module 86 selects the digital device current reference $I_{rd}$. That is, under this condition, the first input terminal of the high port voltage operational amplifier 91 is configured to receive the reference voltage $2\times V_{rc}$, the second input terminal of the high port voltage operational amplifier 91 is configured to receive the high voltage sense signal $V_H$, and the high port voltage operational amplifier 91 generates the high port voltage compensation signal $C_{VH}$ based on the high voltage sense signal $V_H$ and the reference voltage $2\times V_{rc}$; the first input terminal of the high port current operational amplifier 92 is configured to receive the battery current reference $I_{rc}$, the second input terminal of the high port current operational amplifier 92 is configured to receive the high port current sense signal $I_H$, and the high port current operational amplifier 92 generates the high port current compensation signal $C_{IH}$ based on the battery current reference $I_{rc}$ and the high port current sense signal $I_H$; the first input terminal of the low port voltage operational amplifier 93 is configured to receive the digital device voltage reference $V_{rd}$, the second input terminal of the low port voltage operational amplifier 93 is configured to receive the low voltage sense signal $V_L$, and the low port voltage operational amplifier 93 generates the low port voltage compensation signal $C_{VL}$ based on the digital device voltage reference $V_{rd}$ and the low voltage sense signal $V_L$; the first input terminal of the low port current operational amplifier 94 is configured to receive the digital device current reference $I_{rd}$, the second input terminal of the low port current operational amplifier 94 is configured to receive the low port current sense signal $I_L$, and the low port current operational amplifier 94 generates the low port current compensation signal $C_{IL}$ based on the digital device current reference $I_{rd}$ and the low port current sense signal $I_L$. The equivalent circuit of the controller is shown as FIG. 5d. The selective unit 95 generates the reference signal Cr based on the above high port voltage compensation signal $C_{VH}$, high port current compensation signal $C_{IH}$, low port voltage compensation signal $C_{VL}$ and low port current compensation signal $C_{IL}$. Then the reference signal Cr is delivered to the logic and control unit 96, so that the logic and control unit 96 generates the first switch control signal $G_1$ and the second switch control signal $G_2$ to control the first power switch 104 and the second power switch 105 to operate at step-down mode. The first power switch 104 is the active switch, and the second power switch 105 is the passive switch.

Figure 6:
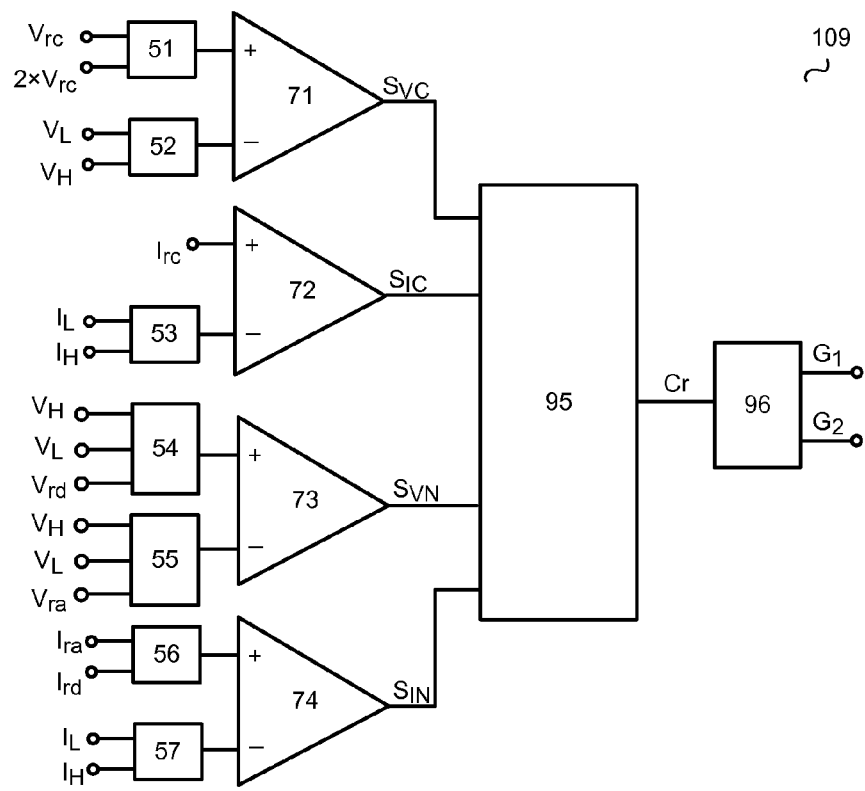
FIG. 6 schematically shows a circuit configuration of the controller 209 in accordance with an embodiment of the present invention.

FIG. 6 schematically shows a circuit configuration of the controller 209 in accordance with an embodiment of the present invention. In the example of FIG. 6, the controller 209 comprises: a battery voltage reference selective module 51, configured to receive a battery voltage reference $V_{rc}$ and a reference voltage $2 \times V_{rc}$ having a voltage level twice than that of the battery voltage reference $V_{rc}$, and to select the battery voltage reference $V_{rc}$ or the reference voltage $2 \times V_{rc}$ as its output signal; a battery voltage selective module 52, configured to receive the high voltage sense signal $V_H$ and the low voltage sense signal $V_L$, and to select the high voltage sense signal $V_H$ or the low voltage sense signal $V_L$ as its output signal; a battery port voltage operational amplifier 71, having a first input terminal, a second input terminal and an output terminal, wherein the first input terminal is configured to receive the battery voltage reference $V_{rc}$ or the reference voltage $2 \times V_{rc}$ via the battery voltage reference selective module 51, the second input terminal is configured to receive the high voltage sense signal $V_H$ or the low voltage sense signal $V_L$ via the battery voltage selective module 52, and the output terminal is configured to generate a battery port voltage compensation signal $S_{VC}$; a battery current selective module 53, configured to receive the high port current sense signal $I_H$ and the low port current sense signal $I_L$, and to select the high port current sense signal $I_H$ or the low port current sense signal $I_L$ as its output signal; a battery port current operational amplifier 72, having a first input terminal, a second input terminal and an output terminal, wherein the first input terminal is configured to receive a battery current reference $I_{rc}$, the second input terminal is configured to receive the high port current sense signal $I_H$ or the low port current sense signal $I_L$ via the battery current selective module 53, and the output terminal is configured to generate a battery port current compensation signal $S_{IC}$; a non-battery voltage selective module 54, configured to receive a digital device voltage reference $V_{rd}$, the high voltage sense signal $V_H$ and the low voltage sense signal $V_L$, and to select either the digital device voltage reference $V_{rd}$, the high voltage sense signal $V_H$, or the low voltage sense signal $V_L$ as its output signal; a non-battery voltage reference selective module 55, configured to receive a power source voltage reference $V_{ra}$, the high voltage sense signal $V_H$ and the low voltage sense signal $V_L$, and to select either the power source voltage reference $V_{ra}$, the high voltage sense signal $V_H$, or the low voltage sense signal $V_L$ as its output signal; a non-battery port voltage operational amplifier 73, having a first input terminal, a second input terminal and an output terminal, wherein the first input terminal is configured to receive either the digital device voltage reference $V_{rd}$, the high voltage sense signal $V_H$, or the low voltage sense signal $V_L$ via the non-battery voltage selective module 54, the second input terminal is configured to receive either the power source voltage reference $V_{ra}$, the high voltage sense signal $V_H$, or the low voltage sense signal $V_L$ via the non-battery voltage reference selective module 55, and the output terminal is configured to generate a non-battery port voltage compensation signal $S_{VN}$; a non-battery current reference selective module 56, configured to receive a power source current reference $I_{ra}$ and a digital device current reference $I_{rd}$, and to select the power source current reference $I_{ra}$ or the digital device current reference $I_{rd}$ as its output signal; a non-battery current selective module 57, configured to receive the low port current sense signal $I_L$ and the high port current sense signal $I_H$, and to select the low port current sense signal $I_L$ or the high port current sense signal $I_H$ as its output signal; a non-battery port current operational amplifier 74, having a first input terminal, a second input terminal and an output terminal, wherein the first input terminal is configured to receive the power source current reference $I_{ra}$ or the digital device current reference $I_{rd}$ via the non-battery current reference selective module 56, the second input terminal is configured to receive the low port current sense signal $I_L$ or the high port current sense signal $I_H$ via the non-battery current selective module 57, and the output terminal is configured to generate a non-battery port current compensation signal $S_{IN}$; a selective unit 95, coupled to the battery port voltage operational amplifier 71, the battery port current operational amplifier 72, the non-battery port voltage operational amplifier 73 and the non-battery port current operational amplifier 74 to receive the battery port voltage compensation signal $S_{VC}$, the battery port current compensation signal $S_{IC}$, the non-battery port voltage compensation signal $S_{VN}$ and the non-battery port current compensation signal $S_{IN}$, respectively, to generate a reference signal Cr, wherein the reference signal Cr is either the battery port voltage compensation signal $S_{VC}$, the battery port current compensation signal $S_{IC}$, the non-battery port voltage compensation signal $S_{VN}$, or the non-battery port current compensation signal $S_{IN}$; and a logic and control unit 96, coupled to the selective unit 95 to receive the reference signal Cr, to generate a first switch control signal $G_1$ and a second switch control signal $G_2$ based on the reference signal Cr. The first power switch 104 and the second power switch 105 are controlled by the first switch control signal $G_1$ and the second switch control signal $G_2$, respectively.

In one embodiment, the selective unit 95 selects either the battery port voltage compensation signal $S_{VC}$, the battery port current compensation signal $S_{IC}$, the non-battery port voltage compensation signal $S_{VN}$, or the non-battery port current compensation signal $S_{IN}$ with the minimum value as the reference signal Cr. That is, in one embodiment, the selective unit 95 may comprise a minimum value selector. In other embodiments, the selective unit 95 may comprise a maximum value selector; it selects either the battery port voltage compensation signal $S_{VC}$, the battery port current compensation signal $S_{IC}$, the non-battery port voltage compensation signal $S_{VN}$, or the non-battery port current compensation signal $S_{IN}$ with the maximum value as the reference signal. If the selective unit 95 comprises the maximum value selector, the battery port voltage operational amplifier 71, the battery port current operational amplifier 72, the non-battery port voltage operational amplifier 73 and the non-battery port current operational amplifier 74 would switch their inverting input terminal and non-inverting input terminal, respectively.

Figure 7A:
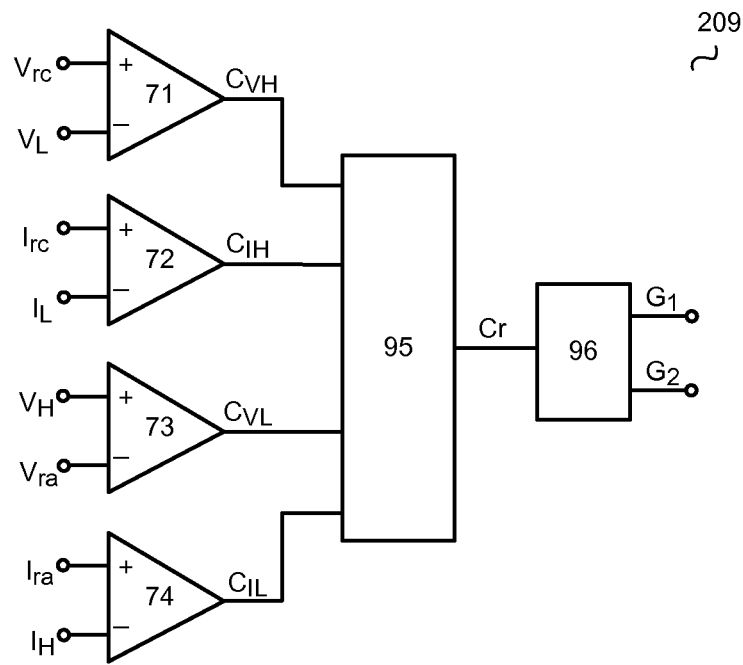
FIGS. 7a-7d schematically shows equivalent circuits of the controller 209 when the high voltage port and the low voltage port are with different coupling situations in accordance with an embodiment the present invention.

When the high voltage port 101 is coupled to a power source, and the low voltage port 102 is coupled to a single battery: the low voltage sense signal $V_L$ is selected by the battery voltage selective module 52 at the second input terminal of the battery port voltage operational amplifier 71, the battery voltage reference $V_{rc}$ is selected by the battery voltage reference selective module 51 at the first input terminal of the battery port voltage operational amplifier 71; the low port current sense signal $I_L$ is selected by the battery current selective module 53 at the second input terminal of the battery port current operational amplifier 72; the high voltage sense signal $V_H$ is selected by the non-battery voltage selective module 54 at the first input terminal of the non-battery port voltage operational amplifier 73, the power source voltage reference $V_{ra}$ is selected by the non-battery voltage reference selective module 55 at the second input terminal of the non-battery port voltage operational amplifier 73; the power source current reference $I_{ra}$ is selected by the non-battery current reference selective module 56 at the first input terminal of the non-battery port current operational amplifier 74, the high port current sense signal $I_H$ is selected by the non-battery current selective module 57 at the second input terminal of the non-battery port current operational amplifier 74. The equivalent circuit of the controller 209 is shown as FIG. 7a. Then the battery port voltage operational amplifier 71, the battery port current operational amplifier 72, the non-battery port voltage operational amplifier 73 and the non-battery port current operational amplifier 74 generates the respective output signal, and the first switch control signal $G_1$ and the second switch control signal $G_2$ are generated via the selective unit 95 and the logic and control unit 96, to control the first power switch 104 and the second power switch 105 to operate at step-down mode, so that the single battery is charged by the power source. The first power switch 104 is the active switch, and the second power switch 105 is the passive switch.

Figure 7B:
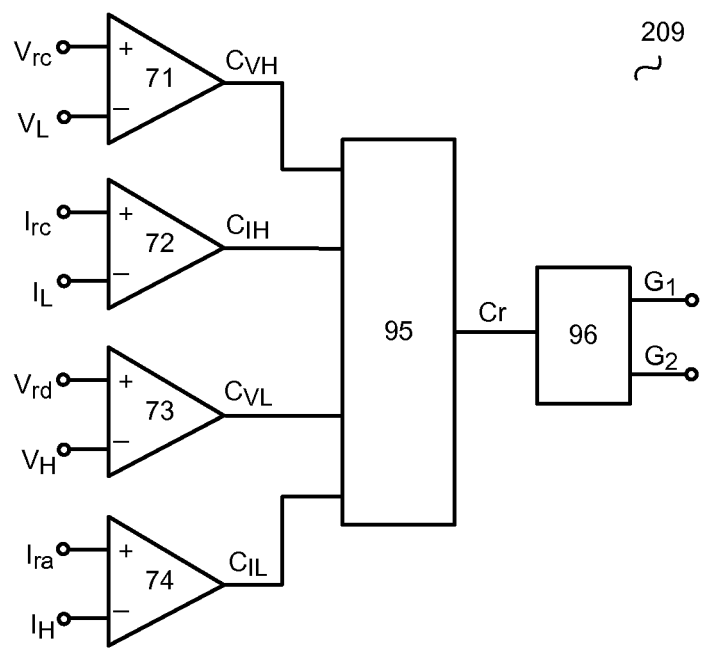

When the high voltage port 101 is coupled to a digital device, and the low voltage port 102 is coupled to a single battery: the low voltage sense signal $V_L$ is selected by the battery voltage selective module 52 at the second input terminal of the battery port voltage operational amplifier 71, the battery voltage reference $V_{rc}$ is selected by the battery voltage reference selective module 51 at the first input terminal of the battery port voltage operational amplifier 71; the low port current sense signal $I_L$ is selected by the battery current selective module 53 at the second input terminal of the battery port current operational amplifier 72; the digital device voltage reference $V_{rd}$ is selected by the non-battery voltage selective module 54 at the first input terminal of the non-battery port voltage operational amplifier 73, the high voltage sense signal $V_H$ is selected by the non-battery voltage reference selective module 55 at the second input terminal of the non-battery port voltage operational amplifier 73; the digital device current reference $I_{rd}$ is selected by the non-battery current reference selective module 56 at the first input terminal of the non-battery port current operational amplifier 74, the high port current sense signal $I_H$ is selected by the non-battery current selective module 57 at the second input terminal of the non-battery port current operational amplifier 74. The equivalent circuit of the controller 209 is shown as FIG. 7b. Then the battery port voltage operational amplifier 71, the battery port current operational amplifier 72, the non-battery port voltage operational amplifier 73 and the non-battery port current operational amplifier 74 generates the respective output signal, and the first switch control signal $G_1$ and the second switch control signal $G_2$ are generated via the selective unit 95 and the logic and control unit 96, to control the first power switch 104 and the second power switch 105 to operate at step-up mode, so that the digital device is powered by the single battery. The first power switch 104 is the passive switch, and the second power switch 105 is the active switch.

Figure 7C:
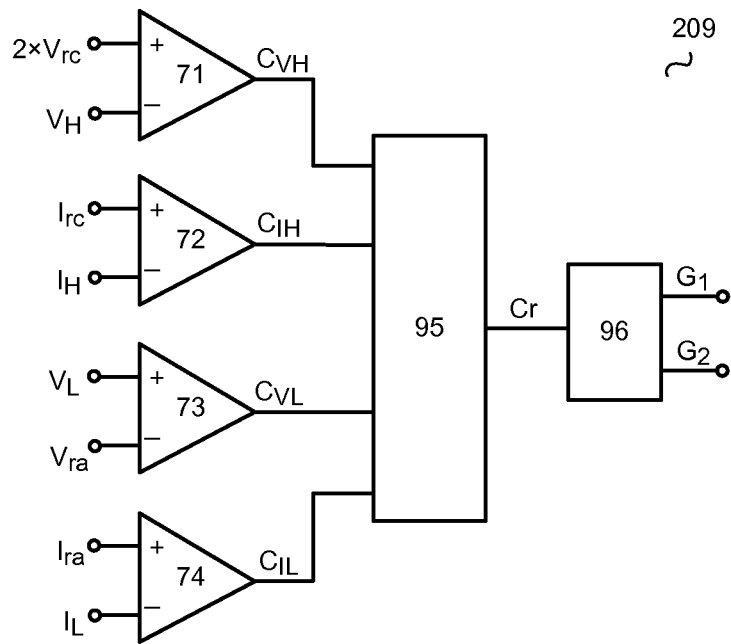

When the high voltage port 101 is coupled to two series coupled batteries, and the low voltage port 102 is coupled to a power source: the high voltage sense signal $V_H$ is selected by the battery voltage selective module 52 at the second input terminal of the battery port voltage operational amplifier 71, the reference voltage $2\times V_{rc}$ is selected by the battery voltage reference selective module 51 at the first input terminal of the battery port voltage operational amplifier 71; the high port current sense signal $I_H$ is selected by the battery current selective module 53 at the second input terminal of the battery port current operational amplifier 72; the low voltage sense signal $V_L$ is selected by the non-battery voltage selective module 54 at the first input terminal of the non-battery port voltage operational amplifier 73, the power source voltage reference $V_{ra}$ is selected by the non-battery voltage reference selective module 55 at the second input terminal of the non-battery port voltage operational amplifier 73; the power source current reference $I_{ra}$ is selected by the non-battery current reference selective module 56 at the first input terminal of the non-battery port current operational amplifier 74, the low port current sense signal $I_L$ is selected by the non-battery current selective module 57 at the second input terminal of the non-battery port current operational amplifier 74. The equivalent circuit of the controller 209 is shown as FIG. 7c. Then the battery port voltage operational amplifier 71, the battery port current operational amplifier 72, the non-battery port voltage operational amplifier 73 and the non-battery port current operational amplifier 74 generates the respective output signal, and the first switch control signal $G_1$ and the second switch control signal $G_2$ are generated via the selective unit 95 and the logic and control unit 96, to control the first power switch 104 and the second power switch 105 to operate at step-up mode, so that the two series coupled batteries are charged by the power source. The first power switch 104 is the passive switch, and the second power switch 105 is the active switch.

Figure 7D:
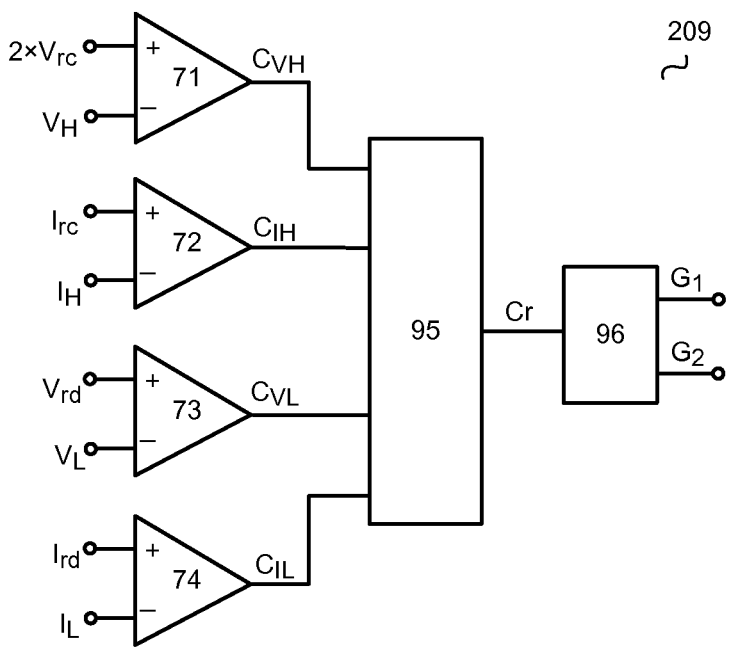

When the high voltage port 101 is coupled to two series coupled batteries, and the low voltage port 102 is coupled to a digital device: the high voltage sense signal $V_H$ is selected by the battery voltage selective module 52 at the second input terminal of the battery port voltage operational amplifier 71, the reference voltage $2\times V_{rc}$ is selected by the battery voltage reference selective module 51 at the first input terminal of the battery port voltage operational amplifier 71; the high port current sense signal $I_H$ is selected by the battery current selective module 53 at the second input terminal of the battery port current operational amplifier 72; the digital device voltage reference $V_{rd}$ is selected by the non-battery voltage selective module 54 at the first input terminal of the non-battery port voltage operational amplifier 73, the low voltage sense signal $V_L$ is selected by the non-battery voltage reference selective module 55 at the second input terminal of the non-battery port voltage operational amplifier 73; the digital device current reference $I_{rd}$ is selected by the non-battery current reference selective module 56 at the first input terminal of the non-battery port current operational amplifier 74, the low port current sense signal $I_L$ is selected by the non-battery current selective module 57 at the second input terminal of the non-battery port current operational amplifier 74. The equivalent circuit of the controller 209 is shown as FIG. 7d. Then the battery port voltage operational amplifier 71, the battery port current operational amplifier 72, the non-battery port voltage operational amplifier 73 and the non-battery port current operational amplifier 74 generates the respective output signal, and the first switch control signal $G_1$ and the second switch control signal $G_2$ are generated via the selective unit 95 and the logic and control unit 96, to control the first power switch 104 and the second power switch 105 to operate at step-down mode, so that the digital device is powered by the two series coupled batteries. The first power switch 104 is the active switch, and the second power switch 105 is the passive switch.

In one embodiment, the power source voltage reference $V_{ra}$ and the digital device voltage reference $V_{rd}$ may be a same signal, e.g., the power source voltage reference $V_{ra}$ and the digital device voltage reference $V_{rd}$ may both have a voltage level of 4.5V. In one embodiment, the power source current reference $I_{ra}$ and the digital device current reference $I_{rd}$ may be also a same signal.

The foregoing discussed selective modules (e.g., the first to sixth selective module 81-86, the battery voltage reference selective module 51, the battery voltage selective module 52, the battery current selective module 53, the non-battery voltage selective module 54, the non-battery voltage reference selective module 55, the non-battery current reference selective module 56, and the non-battery current selective module 57) may be realized by switches. For example, the battery voltage reference selective module 51, the battery voltage selective module 52, the battery current selective module 53, the non-battery current reference selective module 56, and the non-battery current selective module 57, the second selective module 82 and the fifth selective module 85 may be realized by a single-pole double-throw switch or by two parallel coupled switches; the first selective module 81, the third selective module 83, the fourth selective module 84, the sixth selective module 86, the non-battery voltage selective module 54, the non-battery voltage reference selective module 55 may be realized by three parallel coupled switches. When the high voltage port 101 and the low voltage port 102 have different couplings, each selective module turns on a corresponding switch, to deliver the corresponding signal to the subsequent circuit, so that the first power switch 104 and the second power switch 105 are controlled to operate at corresponding mode. However, one skilled in the art should realize that each selective module may have other appropriate configurations to select different signals.

Figure 8:
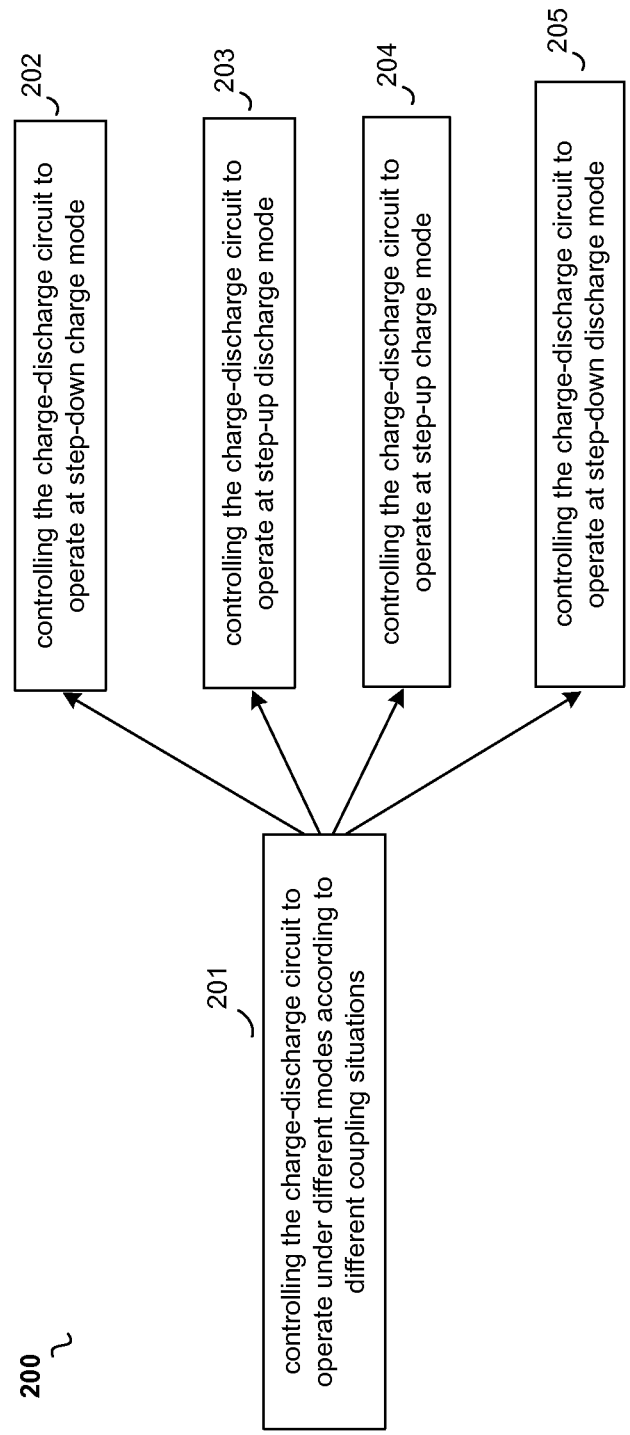
FIG. 8 schematically shows a method 200 used for a power bank circuit in accordance with an embodiment of the present invention.

FIG. 8 schematically shows a method 200 used for a power bank circuit in accordance with an embodiment of the present invention, the power bank circuit including a high voltage port, a low voltage port, and a charge-discharge circuit coupled between the high voltage port and the low voltage port, the method comprises:

Step 201, controlling the charge-discharge circuit to operate under different modes according to different coupling situations: when the high voltage port is coupled to a power source, and the low voltage port is coupled to a single battery, go to step 202: controlling the charge-discharge circuit to operate at step-down charge mode, so that the single battery is charged by the power source; when the high voltage port is coupled to a digital device, and the low voltage port is coupled to the single battery, go to step 203: controlling the charge-discharge circuit to operate at step-up discharge mode, so that the digital device is powered by the single battery; when the high voltage port is coupled to two series coupled batteries, and the low voltage port is coupled to the power source, go to step 204: controlling the charge-discharge circuit to operate at step-up charge mode, so that the two series coupled batteries are charged by the power source; and when the high voltage port is coupled to the two series coupled batteries, and the low voltage port is coupled to the digital device, go to step 205: controlling the charge-discharge circuit to operate at step-down discharge mode, so that the digital device is powered by the two series coupled batteries.

Several embodiments of the foregoing power bank circuit control the power switches to operate at different modes according to different external configurations, e.g., the 1-cell/2-cell is charged by the power source, or the 1-cell/2-cell is supplied to other digital devices, which well meets customer requirements.

It is to be understood in these letters patent that the meaning of "A" is coupled to "B" is that either A and B are connected to each other as described below, or that, although A and B may not be connected to each other as described above, there is nevertheless a device or circuit that is connected to both A and B. This device or circuit may include active or passive circuit elements, where the passive circuit elements may be distributed or lumped-parameter in nature. For example, A may be connected to a circuit element that in turn is connected to B.

This written description uses examples to disclose the invention, including the best mode, and also to enable a person skilled in the art to make and use the invention. The patentable scope of the invention may include other examples that occur to those skilled in the art.

We claim:

1. A power bank circuit, comprising:
a high voltage port;
a low voltage port;
an intermediate port;
a first power switch, coupled between the high voltage port and the intermediate port;
a second power switch, coupled between the intermediate port and a reference ground;
an inductor, coupled between the low voltage port and the intermediate port;
a first capacitor, coupled between the high voltage port and the reference ground;
a second capacitor, coupled between the low voltage port and the reference ground; and
a controller, configured to receive: a high voltage sense signal indicative of a voltage at the high voltage port, a high port current sense signal indicative of a current flowing through the high voltage port, a low voltage sense signal indicative of a voltage at the low voltage port, a low port current sense signal indicative of a current flowing through the low voltage port, and wherein the controller is configured to generate a first switch control signal and a second switch control signal to control the operations of the first power switch and the second power switch, respectively.

2. The power bank circuit of claim 1, wherein
the high voltage port is coupled to either a power source, a digital device, or a plurality of series coupled batteries; and
the low voltage port is coupled to either a power source, a digital device, or a single battery.

3. The power bank circuit of claim 1, wherein the controller comprises:
a first selective module, configured to receive the high voltage sense signal, a digital device voltage reference, and a reference voltage having a voltage level twice than that of a battery voltage reference, and to select either the high voltage sense signal, the digital device voltage reference or the reference voltage as its output signal;
a second selective module, configured to receive a power source voltage reference and the high voltage sense signal, and to select the power source voltage reference or the high voltage sense signal as its output signal;
a high port voltage operational amplifier, having a first input terminal, a second input terminal and an output terminal, wherein the first input terminal is configured to receive one of either the high voltage sense signal, the digital device voltage reference, or the reference voltage via the first selective module, the second input terminal is configured to receive the power source voltage reference or the high voltage sense signal via the second selective module, and the output terminal is configured to generate a high port voltage compensation signal;

a third selective module, configured to receive a power source current reference, a digital device current reference, and a battery current reference, and to select either the power source current reference, the digital device current reference, or the battery current reference as its output signal;

a high port current operational amplifier, having a first input terminal, a second input terminal and an output terminal, wherein the first input terminal is configured to receive either the power source current reference, the digital device current reference, or the battery current reference via the third selective module, the second input terminal is configured to receive the high port current sense signal, and the output terminal is configured to generate a high port current compensation signal;

a fourth selective module, configured to receive the low voltage sense signal, the digital device voltage reference and the battery voltage reference, and to select either the low voltage sense signal, the digital device voltage reference, or the battery voltage reference as its output signal;

a fifth selective module, configured to receive the low voltage sense signal and the power source voltage reference, and to select the low voltage sense signal or the power source voltage reference as its output signal;

a low port voltage operational amplifier, having a first input terminal, a second input terminal and an output terminal, wherein the first input terminal is configured to receive either the low voltage sense signal, the digital device voltage reference, or the battery voltage reference via the fourth selective module, the second input terminal is configured to receive the low voltage sense signal or the power source voltage reference via the fifth selective module, and the output terminal is configured to generate a low port voltage compensation signal;

a sixth selective module, configured to receive the power source current reference, the digital device current reference and the battery current reference, and to select either the power source current reference, the digital device current reference, or the battery current reference as its output signal;

a low port current operational amplifier, having a first input terminal, a second input terminal and an output terminal, wherein the first input terminal is configured to receive either the power source current reference, the digital device current reference, or the battery current reference via the sixth selective module, the second input terminal is configured to receive the low port current sense signal, and the output terminal is configured to generate a low port current compensation signal;

a selective unit, coupled to the high port voltage operational amplifier, the high port current operational amplifier, the low port voltage operational amplifier and the low port current operational amplifier to receive the high port voltage compensation signal, the high port current compensation signal, the low port voltage compensation signal and the low port current compensation signal, respectively, to generate a reference signal, wherein the reference signal is either the high port voltage compensation signal, the high port current compensation signal, the low port voltage compensation signal, or the low port current compensation signal; and a logic and control unit, coupled to the selective unit to receive the reference signal, to generate the first switch control signal and the second switch control signal based on the reference signal.

4. The power bank circuit of claim 3, wherein when the high voltage port is coupled to a power source, and the low voltage port is coupled to a single battery:
the first selective module selects the high voltage sense signal to the first input terminal of the high port voltage operational amplifier;
the second selective module selects the power source voltage reference to the second input terminal of the high port voltage operational amplifier;
the third selective module selects the power source current reference to the first input terminal of the high port current operational amplifier;
the fourth selective module selects the battery voltage reference to the first input terminal of the low port voltage operational amplifier;
the fifth selective module selects the low voltage sense signal to the second input terminal of the low port voltage operational amplifier; and
the sixth selective module selects the battery current reference to the first input terminal of the low port current operational amplifier.

5. The power bank circuit of claim 3, wherein when the high voltage port is coupled to a digital device, and the low voltage port is coupled to the single battery:
the first selective module selects the digital device voltage reference to the first input terminal of the high port voltage operational amplifier;
the second selective module selects the high voltage sense signal to the second input terminal of the high port voltage operational amplifier;
the third selective module selects the digital device current reference to the first input terminal of the high port current operational amplifier;
the fourth selective module selects the battery voltage reference to the first input terminal of the low port voltage operational amplifier;
the fifth selective module selects the low voltage sense signal to the second input terminal of the low port voltage operational amplifier; and
the sixth selective module selects the battery current reference to the first input terminal of the low port current operational amplifier.

6. The power bank circuit of claim 3, wherein when the high voltage port is coupled to two series coupled batteries, and the low voltage port is coupled to the power source:
the first selective module selects the reference voltage to the first input terminal of the high port voltage operational amplifier;
the second selective module selects the high voltage sense signal to the second input terminal of the high port voltage operational amplifier;
the third selective module selects the battery current reference to the first input terminal of the high port current operational amplifier;
the fourth selective module selects the low voltage sense signal to the first input terminal of the low port voltage operational amplifier;
the fifth selective module selects the power source voltage reference to the second input terminal of the low port voltage operational amplifier; and
the sixth selective module selects the power source current reference to the first input terminal of the low port current operational amplifier.

7. The power bank circuit of claim 3, wherein when the high voltage port is coupled to two series coupled batteries, and the low voltage port is coupled to the digital device:

the first selective module selects the reference voltage to the first input terminal of the high port voltage operational amplifier;

the second selective module selects the high voltage sense signal to the second input terminal of the high port voltage operational amplifier;

the third selective module selects the battery current reference to the first input terminal of the high port current operational amplifier;

the fourth selective module selects the digital device voltage reference to the first input terminal of the low port voltage operational amplifier;

the fifth selective module selects the low voltage sense signal to the second input terminal of the low port voltage operational amplifier; and the sixth selective module selects the digital device current reference to the first input terminal of the low port current operational amplifier.

8. The power bank circuit of claim 3, wherein each of the first selective module, the third selective module, the fourth selective module and the sixth selective module comprises three parallel coupled switches; and each of the second selective module and the fifth selective module comprises a single-pole double-throw switch or two parallel coupled switches.

9. The power bank circuit of claim 3, wherein the selective unit selects either the high port voltage compensation signal, the high port current compensation signal, the low port voltage compensation signal, or the low port current compensation signal with the minimum value as the reference signal.

10. The power bank circuit of claim 3, wherein the logic and control unit comprises:

a comparator, having a first input terminal, a second input terminal and an output terminal, wherein the first input terminal is configured to receive an inductor current sense signal indicative of a current flowing through the inductor, the second input terminal is configured to receive the reference signal, and the output terminal is configured to generate a comparison signal based on the inductor current sense signal and the reference signal;

a clock signal generator, configured to generate a clock signal; and a RS flip-flop, having a set input terminal, a reset input terminal, a first output terminal and a second output terminal, wherein the set input terminal is coupled to the clock signal generator to receive the clock signal, the reset input terminal is coupled to the output terminal of the comparator to receive the comparison signal, based on the clock signal and the comparison signal, the RS flip-flop generates the first switch control signal at the first output terminal and generates the second switch control signal at the second output terminal.

11. The power bank circuit of claim 1, wherein the controller comprises:

a battery voltage reference selective module, configured to receive a battery voltage reference and a reference voltage having a voltage level twice than that of a battery voltage reference, and to select the battery voltage reference or the reference voltage as its output signal;

a battery voltage selective module, configured to receive the high voltage sense signal and the low voltage sense signal, and to select the high voltage sense signal or the low voltage sense signal as its output signal;

a battery port voltage operational amplifier, having a first input terminal, a second input terminal and an output terminal, wherein the first input terminal is configured to receive the battery voltage reference or the reference voltage via the battery voltage reference selective module, the second input terminal is configured to receive the high voltage sense signal or the low voltage sense signal via the battery voltage selective module, and the output terminal is configured to generate a battery port voltage compensation signal;

a battery current selective module, configured to receive the high port current sense signal and the low port current sense signal, and to select the high port current sense signal or the low port current sense signal as its output signal;

a battery port current operational amplifier, having a first input terminal, a second input terminal and an output terminal, wherein the first input terminal is configured to receive a battery current reference, the second input terminal is configured to receive the high port current sense signal or the low port current sense signal via the battery current selective module, and the output terminal is configured to generate a battery port current compensation signal;

a non-battery voltage selective module, configured to receive a digital device voltage reference, the high voltage sense signal and the low voltage sense signal, and to select either the digital device voltage reference, the high voltage sense signal, or the low voltage sense signal as its output signal;

a non-battery voltage reference selective module, configured to receive a power source voltage reference, the high voltage sense signal and the low voltage sense signal, and to select either the power source voltage reference, the high voltage sense signal, or the low voltage sense signal as its output signal;

a non-battery port voltage operational amplifier, having a first input terminal, a second input terminal and an output terminal, wherein the first input terminal is configured to receive either the digital device voltage reference, the high voltage sense signal, or the low voltage sense signal via the non-battery voltage selective module, the second input terminal is configured to receive either the power source voltage reference, the high voltage sense signal, or the low voltage sense signal via the non-battery voltage reference selective module, and the output terminal is configured to generate a non-battery port voltage compensation signal;

a non-battery current reference selective module, configured to receive a power source current reference and a digital device current reference, and to select the power source current reference or the digital device current reference as its output signal;

a non-battery current selective, configured to receive the low port current sense signal and the high port current sense signal, and to select the low port current sense signal or the high port current sense signal as its output signal;

a non-battery port current operational amplifier, having a first input terminal, a second input terminal and an output terminal, wherein the first input terminal is configured to receive the power source current reference or the digital device current reference via the non-battery current reference selective module, the second input terminal is configured to receive the low port current sense signal or the high port current sense signal via the non-battery current selective module, and the output terminal is configured to generate a non-battery port current compensation signal;

a selective unit, coupled to the battery port voltage operational amplifier, the battery port current operational amplifier, the non-battery port voltage operational amplifier and the non-battery port current operational amplifier to receive the battery port voltage compensation signal, the battery port current compensation signal, the non-battery port voltage compensation signal and the non-battery port current compensation signal, respectively, to generate a reference signal, wherein the reference signal is either the battery port voltage compensation signal, the battery port current compensation signal, the non-battery port voltage compensation signal, or the non-battery port current compensation signal; and a logic and control unit, coupled to the selective unit to receive the reference signal, to generate a first switch control signal and a second switch control signal based on the reference signal.

12. The power bank circuit of claim 11, wherein when the high voltage port is coupled to a power source, and the low voltage port is coupled to a single battery:

the battery voltage reference selective module selects the battery voltage reference to the first input terminal of the battery port voltage operational amplifier;

the battery voltage selective module selects the low voltage sense signal to the second input terminal of the battery port voltage operational amplifier;

the battery current selective module selects the low port current sense signal to the second input terminal of the battery port current operational amplifier;

the non-battery voltage selective module selects the high voltage sense signal to the first input terminal of the non-battery port voltage operational amplifier;

the non-battery voltage reference selective module selects the power source voltage reference to the second input terminal of the non-battery port voltage operational amplifier;

the non-battery current reference selective module selects the power source current reference to the first input terminal of the non-battery port current operational amplifier; and the non-battery current selective module selects the high port current sense signal to the second input terminal of the non-battery port current operational amplifier.

13. The power bank circuit of claim 11, when the high voltage port is coupled to a digital device, and the low voltage port is coupled to the single battery:

the battery voltage reference selective module selects the battery voltage reference to the first input terminal of the battery port voltage operational amplifier;

the battery voltage selective module selects the low voltage sense signal to the second input terminal of the battery port voltage operational amplifier;

the battery current selective module selects the low port current sense signal to the second input terminal of the battery port current operational amplifier;

the non-battery voltage selective module selects the digital device voltage reference to the first input terminal of the non-battery port voltage operational amplifier;

the non-battery voltage reference selective module selects the high voltage sense signal to the second input terminal of the non-battery port voltage operational amplifier;

the non-battery current reference selective module selects the digital device current reference to the first input terminal of the non-battery port current operational amplifier; and the non-battery current selective module selects the high port current sense signal to the second input terminal of the non-battery port current operational amplifier.

14. The power bank circuit of claim 11, when the high voltage port is coupled to two series coupled batteries, and the low voltage port is coupled to the power source:

the battery voltage reference selective module selects the reference voltage to the first input terminal of the battery port voltage operational amplifier;

the battery voltage selective module selects the high voltage sense signal to the second input terminal of the battery port voltage operational amplifier;

the battery current selective module selects the high port current sense signal to the second input terminal of the battery port current operational amplifier;

the non-battery voltage selective module selects the low voltage sense signal to the first input terminal of the non-battery port voltage operational amplifier;

the non-battery voltage reference selective module selects the power source voltage reference to the second input terminal of the non-battery port voltage operational amplifier; and the non-battery current reference selective module selects the power source current reference to the first input terminal of the non-battery port current operational amplifier, the non-battery current selective module selects the low port current sense signal to the second input terminal of the non-battery port current operational amplifier.

15. The power bank circuit of claim 11, when the high voltage port is coupled to two series coupled batteries, and the low voltage port is coupled to the digital device:

the battery voltage reference selective module selects the reference voltage to the first input terminal of the battery port voltage operational amplifier;

the battery voltage selective module selects the high voltage sense signal to the second input terminal of the battery port voltage operational amplifier;

the battery current selective module selects the high port current sense signal to the second input terminal of the battery port current operational amplifier;

the non-battery voltage selective module selects the digital device voltage reference to the first input terminal of the non-battery port voltage operational amplifier;

the non-battery voltage reference selective module selects the low voltage sense signal to the second input terminal of the non-battery port voltage operational amplifier;

the non-battery current reference selective module selects the digital device current reference to the first input terminal of the non-battery port current operational amplifier; and the non-battery current selective module selects the low port current sense signal to the second input terminal of the non-battery port current operational amplifier.

16. A method used for a power bank circuit, the power bank circuit including a high voltage port, a low voltage port, and a charge-discharge circuit coupled between the high voltage port and the low voltage port, the method comprising:

controlling the charge-discharge circuit to operate under different modes according to different coupling situations:

when the high voltage port is coupled to a power source, and the low voltage port is coupled to a single battery: controlling the charge-discharge circuit to operate at step-down charge mode, so that the single battery is charged by the power source;

when the high voltage port is coupled to a digital device, and the low voltage port is coupled to the single battery: controlling the charge-discharge circuit to operate at step-up discharge mode, so that the digital device is powered by the single battery;

when the high voltage port is coupled to two series coupled batteries, and the low voltage port is coupled to the power source: controlling the charge-discharge circuit to operate at step-up charge mode, so that the two series coupled batteries are charged by the power source; and when the high voltage port is coupled to the two series coupled batteries, and the low voltage port is coupled to the digital device: controlling the charge-discharge circuit to operate at step-down discharge mode, so that the digital device is powered by the two series coupled batteries.

* * * * *